United States Patent Office 2,997,452
Patented Aug. 22, 1961

2,997,452
PROCESS OF CURING 1-OLEFIN COPOLYMERS WITH A TRIHALOMELAMINE AND ZINC OR CADMIUM SALTS AND PRODUCT THEREOF
Henry S. Makowski, Roselle Park, and James V. Fusco, Westfield, N.J., assignors to Esso Research and Engineering Company, a corporation of Delaware
No Drawing. Filed Dec. 19, 1957, Ser. No. 703,750
15 Claims. (Cl. 260—41)

This invention relates to cured rubbery, substantially amorphous, ethylene-alpha olefin copolymers. More particularly it relates to materials of this nature cured with a trihalomelamine and preferably also with a metal compound.

Rubbery, substantially amorphous, ethylene-alpha olefin copolymers have become of increasing interest particularly with the introduction of the low pressure processes for their preparation. These materials, being very amorphous, have low tensile strengths and low softening and melting points. The copolymers do not contain sufficient unsaturation or other functional groups so as to be capable of being cured with sulfur and other curing agents. Thus, dibasic acids, glycols, polyols, diamines, amines and metal oxides by themselves, all known as curing agents, are also ineffective.

It has now surprisingly been found that these copolymers can be cured to superior products by treating them with a trihalomelamine. This curing is rendered even more satisfactory by the additional utilization of a metal compound. The manner in which cross-linking is effected in these polymer systems with trihalomelamine is not thoroughly understood. But presumably the polymer is chlorinated by the trichloromelamine and then the polymer is cross-linked through the halogens on the polymer and the amine groups on the trihalomelamine. This may explain the superior properties of the products. The metal salts further improve the properties. The use of a group II metal compound together with the trihalomelamine thus gives a synergistic effect.

The curing of the polymers is effected by thorough contacting of the polymer with the curing agents and fillers as desired, e.g., on a rubber mill or in a Banbury mixer and subjecting the resulting mixture to temperatures of about 250° F. to 350° F. for from 5 to 240 minutes, preferably 15 to 120 minutes.

The trihalomelamine is utilized in an amount of from 2 to 25 parts by weight per 100 parts of polymer, generally between about 5 to 10 parts. The amount of trihalomelamine required to give decidedly improved vulcanizate properties will vary with the mol. wt. of the polymer and the composition of the polymer. The higher the mol. weight and the higher the alpha-olefin content, the less trihalomelamine is required. Thus for a mol. weight of about 100,000, 10 parts and less of trihalomelamine is effective. While various trihalomelamines can be used trichloromelamine is particularly effective and desirable. Its formula is shown below.

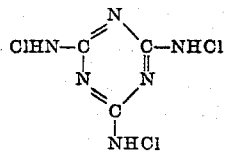

The metal compounds that can additionally be used are e.g., the carbonates, oxides, sulfides, nitrates, phosphates, sulfates, and organic acid salts of zinc and cadmium. Particularly effective are the zinc metal derivatives (Zn stearate, ZnO, ZnS, $ZnCO_3$). The zinc component of the metal compound appears to be the important consideration with the rest of the molecule being less important. Especially effective and desirable is zinc oxide. The metal compound is utilized in an amount of from 1 to 25 parts by weight per 100 parts of polymer with 5 to 15 parts being preferred.

Fillers are also desirable and a variety of carbon blacks may be used. Best results are obtained with semi-reinforcing or highly reinforcing carbon blacks such as Pelletex NS, Kosmobile S–66, etc. The use of carbon black as a filler is especially desirable since presumably carbon black reinforcement increases by some form of trichloromelamine reaction and interaction with the polymer system. The amount of carbon black used can be from 10 parts to 60 parts by weight, but more generally 40 to 50 parts per 100 parts of polymer. Pelletex NS is a semi-reinforcing furnace black, non-staining (SRF) and Kosmobile S–66 is medium processing channel black (MPC).

The polymers cured according to this invention are rubbery, substantially amorphous (having less than about 5 wt. percent crystallinity) copolymers of ethylene and other alpha olefins, although polymers with a higher degree of crystallinity are just as readily cured. The copolymers thus include $C_3$ to $C_5$ alpha olefins such as propylene, butene-1, and pentene-1. Propylene is particularly preferred as the other alpha olefin. These copolymers in general have a molecular weight of 50,000 to 500,000 (Harris correlation) although lower and higher molecular weights are sometimes obtained, and the amount of ethylene in the copolymers can range from 15 to 85 mol. percent.

While these copolymers can be obtained by a variety of processes they are most advantageously prepared by the recently developed, so-called low pressure processes, e.g. see Belgian Patent 538,782 and "Scientific American," September 1957, pages 98 et seq.

In that process the copolymers are prepared by polymerizing the constituent monomers in the indicated proportions with the aid of certain polymerization catalysts, e.g. as described in Belgian Patent 538,782. The catalysts are solid insoluble reaction products obtained by reducing a reducible, heavy, transition compound of a group IVB–VIB or VIII metal or manganese, etc. with a reducing organometallic compound of an alkali, alkaline earth, rare earth or zinc metal compound, or by reducing an appropriate metal compound with the aid of metallic aluminum, or a mixture of aluminum and titanium, etc. The preferred catalyst of this type is usually prepared by reducing 1 mole of a titanium tetrahalide, usually tetrachloride, to the corresponding trivalent or sub-trivalent titanium halide with about 0.2 to 6 moles of aluminum triethyl, triisobutyl or other aluminum alkyl compound of the formula RR'AlX. In this formula, R, R' and X preferably are alkyl groups of 2 to 8 carbon atoms, although X may alternatively be hydrogen or a halogen, notably chlorine. The reduction is best carried out by dissolving each of the two catalyst components in an inert solvent, preferably a $C_3$ to $C_{18}$ paraffin such as isopentane or n-heptane, and mixing the two solutions in the proper proportions at temperatures between 0° and 150° C. and in the absence of moisture, oxygen and sulfur impurities. The resulting precipitate in conjunction with some free aluminum alkyl compound is generally considered to constitute the actual active polymerization catalyst. Consequently, it has been considered best to carry out the catalyst preparation using only about 0.3 to 0.8 mole of the aluminum alkyl compound per mole of titanium chloride, and then add a supplemental amount of the aluminum alkyl compound to the polymerization zone to raise the Al/Ti mole ratio therein to a value between about 1:1 and 3:1.

Also, copolymerization can be effected with ball milled $TiCl_3(TiCl_3 \cdot xAlCl_3) + Al(Et)_3$ catalysts.

The monomers are then contacted with the resulting catalysts in the presence of the same or differing inert hydrocarbon solvent such as isopentane, n-heptane, xylene, etc. The polymerization is conveniently effected at temperatures of about 0° to 100° C. and pressures ranging from about 0 to 500 p.s.i.g., usually 0 to 50 p.s.i.g. The catalyst concentration in the polymerization zone is preferably in the range of about 0.1 to 0.5% based on total liquid and the copolymer product concentration in the polymerization zone is preferably kept between about 2 to 25% based on total contents so as to allow easy handling of the polymerized mixture. The proper copolymer concentration can be obtained by having enough of the inert diluent present or by stopping the polymerization short of 100% conversion, etc. When the desired degree of polymerization has been reached, a $C_1$ to $C_8$ alkanol such as isopropyl alcohol or n-butyl alcohol, desirably in combination with a chelating agent such as acetylacetone is normally added to the reaction mixture for the purpose of dissolving and deactivating the catalyst and for precipitating the polymer product from solution. After filtration, the solid copolymer may be further washed with alcohol or acid such as hydrochloric acid, dried, compacted and packaged.

Since the slurry characteristics at the end of polymerization are such that the polymer is partially dissolved with the remainder being highly solvated, it has also been found that washing this slurry with a methanol-concentrated HCl mixture (ca. 90–10 by volume has been effective) from 1 to 4 times does a very effective job of removing the catalyst residues. The hydrocarbon-polymer slurry remaining thereafter is treated with a sufficient excess of anti-solvent (pure methanol or acetone) to isolate the polymer. The polymer so produced is white in color and is not decolorized on molding in a hot press indicating the effective removal of catalyst residue.

It is to be understood that the term "low pressure" copolymer as used herein connotes material prepared in the indicated manner.

This invention can also be applied to homo-polymers obtained by that process, such as amorphous polypropylene.

This invention and its advantages will be better understood by reference to the following examples.

Example 1

The copolymer used in this example was an ethylene-propylene copolymer prepared from a feed of 50% ethylene and 50% propylene with an $AlEt_3$—$TiCl_4$ (Al/Ti = 2.0)

catalyst. The copolymer had an inherent viscosity (in tetralin at 125° C. at a concentration of 1 g./l.) of 2.32. This corresponds to a mol. wt. of 140,000 on the I. Harris polyethylene correlation (J. Pol. Sci., 8, 361 (1952)).

On a warm rubber mill 50 parts Pelletex NS and 5 parts trichloromelamine were added to 100 parts of the copolymer described above. A control was prepared in the same manner, i.e. 50 parts of Pelletex NS was added to 100 parts of copolymer with the exclusion of trichloromelamine. The compounded stocks were heated in a suitable mold for 30 minutes and 60 minutes at 380° F. Since the control stock resulted in rough, bubbly pads unsuitable for testing, a smooth control pad was obtained by molding with heat under pressure for a short duration. The following results were obtained:

| Cure | 5 parts trichloromelamine | | Control | |
|---|---|---|---|---|
| | Tensile Strength, p.s.i. | Elong., Percent | Tensile Strength, p.s.i. | Elong., Percent |
| 0 | | | 766 | 542 |
| 30'/308° F | 1,027 | 536 | Rough, Bubbly Pads | |
| 60'/308° F | 997 | 492 | | |

The data illustrate the improvement that can be obtained with as little as 5 parts trichloromelamine for as short a cure time as 30 minutes.

Examples 2 and 3

The same copolymer and procedure were used as in Example 1 except that 10 parts (Example 2) and 15 parts (Example 3) of trichloromelamine were used. The compounded stocks were cured for 30, 60, 90 and 120 minutes at 308° F. The following results were obtained.

| Cure | Example 2 | | Example 3 | |
|---|---|---|---|---|
| | Tensile Strength, p.s.i. | Elong., Percent | Tensile Strength, p.s.i. | Elong., Percent |
| 30'/308° F | 1,315 | 548 | 1,270 | 472 |
| 60'/308° F | 1,231 | 500 | 1,285 | 480 |
| 90'/308° F | 1,187 | 520 | 1,230 | 448 |
| 120'/308° F | 1,105 | 484 | 1,253 | 456 |

These data show that further improvement can be obtained by using more trichloromelamine (compare Example 1). However, they also show that maximum tensile improvement is obtained with 10 parts or less of trichloromelamine. Finally, the data again illustrate the rapidity with which these improvements are obtained—a short cure time of 30 minutes.

Example 4

The polymer used in this example was prepared from a feed of 75% ethylene-25% propylene with an $AlEt_3$—$TiCl_4$ (Al/Ti = 2.0) catalyst. The copolymer had an inherent viscosity (in tetralin at 125° C. at a concentration of 1 g./l.) of 2.30. This corresponds to a mol. wt. of 140,000 on the I. Harris polyethylene correlation.

The copolymer (100 parts) was mixed with 50 parts Pelletex NS and 10 parts trichloromelamine on a warm rubber mill as described in Example 1. The compounded stock was cured for 30, 60, 90, and 120 minutes at 308° F. A control pad was prepared from 100 parts copolymer and 50 parts Pelletex NS in the manner described in Example 1. The following results were obtained.

| Cure | Example 4 | | Control | |
|---|---|---|---|---|
| | Tensile Strength, p.s.i. | Elong., Percent | Tensile Strength, p.s.i. | Elong., Percent |
| 0 | | | 718 | 430 |
| 30'/308° F | 1,409 | 391 | | |
| 60'/308° F | 1,419 | 364 | | |
| 90'/308° F | 1,390 | 352 | | |
| 120'/308° F | 1,264 | 340 | | |

The data again illustrate the marked improvement brought about by trichloromelamine and the short cure times required for maximum improvement. Example 4 also shows that improvements are obtained with copolymers of varied composition, cf. Example 4 (copolymer prepared from 75% $C_2$=–25% $C_3$=) and Examples 1–3 (copolymer prepared from 50% $C_2$=–50% $C_3$=).

Example 5

The copolymer in this example was prepared from a feed of 50% ethylene-50% propylene with an AlEt$_3$—TiCl$_4$ (Al/Ti=2.0) catalyst. This copolymer had approximately a composition of 50% ethylene-50% propylene, and had an inherent viscosity (in tetralin at 125° C. at a concentration of 1 g./l.) of 2.32 which corresponds to a Harris molecular weight of 140,000.

The following recipes were compounded on a cool rubber mill:

Recipe 1:
    Copolymer (1261-91) _____ 100
    Pelletex NS _____ 50

Recipe 2:
    Copolymer (1261-91) _____ 100
    Pelletex NS _____ 50
    Trichloromelamine _____ 10

Recipe 3:
    Copolymer (1261-91) _____ 100
    Pelletex NS _____ 50
    Trichloromelamine _____ 10
    Zinc oxide _____ 10

The recipes were cured at 308° F. with the following results:

| Cure | Recipe 1 | | Recipe 2 | | Recipe 3 | |
|---|---|---|---|---|---|---|
| | Tensile Strength, p.s.i. | Elong., Percent | Tensile Strength, p.s.i. | Elong., Percent | Tensile Strength, p.s.i. | Elong., Percent |
| 0 | 766 | 542 | | | | |
| 30'/308° F | | | 1,315 | 548 | 1,174 | 380 |
| 60'/308° F | | | 1,231 | 500 | 1,340 | 364 |
| 90'/308° F | | | 1,187 | 520 | 1,456 | 380 |
| 120'/308° F | | | 1,105 | 484 | 1,432 | 336 |

This example shows that marked improvement in vulcanizate tensile strength over the control occurs when trichloromelamine is used as a curing agent alone, but it further illustrates the improvement obtained by the additional use of zinc oxide. The elongation data further indicate a higher density of cross-links when zinc oxide is used. A tensile strength as high as 1456 p.s.i. (90'/308° F.) is obtained with zinc oxide while the best tensile strength with trichloromelamine alone is 1315 p.s.i. (30'/308° F.).

Example 6

The same copolymer as in Example 5 was utilized.
The following recipes were compounded on a cool mill and cured at 308° F.

Recipe 1:
    Copolymer (1261-91) _____ 100
    Pelletex NS _____ 50
    Trichloromelamine _____ 15

Recipe 2:
    Copolymer (1261-91) _____ 100
    Pelletex NS _____ 50
    Trichloromelamine _____ 15
    Zinc oxide _____ 10

| Cure | Recipe 1 | | Recipe 2 | |
|---|---|---|---|---|
| | Tensile Strength, p.s.i. | Percent Elong. | Tensile Strength, p.s.i. | Percent Elong. |
| 30'/308° F | 1,270 | 472 | 1,607 | 296 |
| 60'/308° F | 1,285 | 480 | 1,768 | 280 |
| 90'/308° F | 1,230 | 448 | 1,694 | 242 |
| 120'/308° F | 1,253 | 456 | 1,841 | 308 |

This example shows that the use of larger amounts of trichloromelamine along with zinc oxide results in a marked improvement (ca. 500 p.s.i. tensile strength) in vulcanizate properties. Note that the uncured control (Polymer, 100; Pelletex NS, 50) had a tensile of but 766 p.s.i. Thus overall improvement exceeded 1000 p.s.i.

Example 7

The copolymer used in this example was prepared from a feed of 75% propylene-25% ethylene with an AlEt$_3$—TiCl$_4$(Al/Ti=2.0) catalyst. The copolymers had an inherent viscosity (in tetralin at 125° C. at a concentration of 1 g./l.) of 1.41 which corresponds to a mol. wt. (Harris) of 64,000.

The following recipes were compounded on a cool mill:

Recipe 1:
    Copolymer (1261-75) _____ 100
    Pelletex NS _____ 50
    Trichloromelamine _____ 10

Recipe 2:
    Copolymer (1261-75) _____ 100
    Pelletex NS _____ 50
    Trichloromelamine _____ 10
    Zinc oxide _____ 10

The compounded recipes were cured at 308° F. with the following results:

| Cure | Recipe 1 | | Recipe 2 | |
|---|---|---|---|---|
| | Tensile Strength, p.s.i. | Elong., Percent | Tensile Strength, p.s.i. | Elong., Percent |
| 30'/308° F | 667 | 180 | 1,045 | 100 |
| 60'/308° F | 649 | 175 | 1,130 | 70 |
| 90'/308° F | 601 | 224 | 1,087 | 106 |
| 120'/308° F | 617 | 172 | | |

This example illustrates that improvement occurs with polymers of varying composition and mol. wt. (cf., results of Example 7—which uses a copolymer of 64,000 mol. wt. prepared from a 25% ethylene-75% propylene feed—and Examples 5 and 6—which use a polymer of 140,000 mol. wt. prepared from a 50% ethylene-50% propylene feed).

Example 8

The copolymer used in this example was prepared from a feed of 50% ethylene-50% propylene with an AlEt$_3$—TiCl$_4$(Al/Ti=2.0) catalyst. The copolymer had an inherent viscosity (in tetralin at 125° C. at a concentration of 1 g./l.) of 1.48 which corresponds to a Harris mol. wt. of 64,000.

The following recipes were compounded on a cool mill:

Recipe 1:
    Copolymer (1261-41) _____ 100
    Pelletex NS _____ 50
    Trichloromelamine _____ 12
    Stearic acid _____ 1

Recipe 2:
    Copolymer (1261-41) _____ 100
    Pelletex NS _____ 50
    Trichloromelamine _____ 12
    Stearic acid _____ 1
    Zinc oxide _____ 10

The recipes were cured at 308° F. with the following results:

| Cure | Recipe 1 | | Recipe 2 | |
|---|---|---|---|---|
| | Tensile Strength, p.s.i. | Elong., Percent | Tensile Strength, p.s.i. | Elong., Percent |
| 60'/308° F | 273 | 514 | 1,053 | 376 |
| 120'/308° F | 293 | 516 | 1,015 | 328 |

This example further illustrates that improvement is obtained when zinc oxide is used in conjunction with trichloromelamine.

Example 9

The copolymer used in this example was a blend of many ethylene-propylene copolymers which were prepared from ethylene-propylene feeds of 25–75, 50–50 and 75–25 with $AlEt_3$—$TiCl_4$ catalysts. This copolymer blend had an inherent viscosity (in tetralin at 125° C. at a concentration of 1 g./l.) of 1.75.

The trichloromelamine used in this example was a 33⅓% trichloromelamine dry mixed blend with $CaCO_3$. It should be kept in mind that $CaCO_3$ (especially in large amounts) can retard the cure of many rubber systems.

The following recipes were compounded on a cool rubber mill:

I
Copolymer _____ 100
Pelletex NS _____ 50

II
Copolymer _____ 100
Pelletex NS _____ 50
Trichloromelamine _____ [1] 30

III
Copolymer _____ 100
Pelletex NS _____ 50
Trichloromelamine _____ [1] 30
Zinc oxide _____ 10

IV
Copolymer _____ 100
Pelletex NS _____ 50
Trichloromelamine _____ [1] 30
Zinc sulfide _____ 10

V
Copolymer _____ 100
Pelletex NS _____ 50
Trichloromelamine _____ [1] 30
Zinc stearate _____ 10

VI
Copolymer _____ 100
Pelletex NS _____ 50
Trichloromelamine _____ [1] 30
Zinc carbonate _____ 20

VII
Copolymer _____ 100
Pelletex NS _____ 50
Trichloromelamine _____ [1] 30
Cadmium sulfide _____ 10

[1] Actually only 10 parts of trichloromelamine blended with 20 parts of $CaCO_3$.

The heavily loaded stocks were cured at 308° F. for 30, 60, 90, 120, and 180 minutes with the following results:

| Cure | I | | II | | III | | IV | | V | | VI | | VII | |
|---|---|---|---|---|---|---|---|---|---|---|---|---|---|---|
| | Tensile | Elong. | Tensile | Elong. | Tensile | Elong. | Tensile | Elong. | Tensile | Elong. | Tensile | Elong. | Tensile | Elong. |
| 30′/308° F | 240 | 510 | 345 | 370 | 610 | 310 | 460 | 405 | 470 | 615 | 340 | 250 | 370 | 470 |
| 60′/308° F | 280 | 480 | 330 | 305 | 690 | 310 | 440 | 375 | 510 | 615 | 395 | 220 | 370 | 510 |
| 90′/308° F | 280 | 480 | 330 | 315 | 780 | 310 | 435 | 385 | 470 | 590 | 600 | 270 | 350 | 470 |
| 120′/308° F | 285 | 450 | 320 | 300 | 650 | 230 | 550 | 380 | 500 | 570 | 430 | 190 | 370 | 500 |
| 180′/308° F | 330 | 460 | 340 | 300 | 930 | 305 | 480 | 365 | 570 | 600 | 430 | 230 | 345 | 570 |

Under the same conditions $MgO$, $MgO_2$, magnesium acetate, magnesium stearate, $Pb_3O_4$, $PbO_2$, $MgCO_3$ were ineffective.

This example shows that, even under conditions of high loading and the presence of a large amount of $CaCO_3$, zinc salts are effective in improving vulcanizate properties. That $CaCO_3$ is deleterious is obvious from only the slight improvement obtained in the absence of zinc salts. Cadmium sulfide under these conditions gives some improvement. Under conditions where $CaCO_3$ is absent the improvement with CdS is marked.

In these examples tensile strength and percent elongation are determined in accordance with A.S.T.M. Test D-412.

The advantages of this invention will be apparent to the skilled in the art. Cured polymer products are provided of improved tensile strength, softening and melting points and elongation.

It is to be understood that this invention is not limited to the specific examples which have been offered merely as illustrations and that modifications may be made without departing from the spirit of the invention.

What is claimed is:

1. A composition of matter comprising a rubbery, substantially amorphous copolymer of ethylene and an alpha monoolefin of 3 to 5 carbon atoms cured by a trihalomelamine.

2. The composition of claim 1 in which the trihalomelamine is trichloromelamine.

3. The composition of claim 2 in which the copolymer is an ethylene-propylene copolymer.

4. The composition of claim 3 in which the copolymer components are present in about equimolar proportions.

5. The composition of claim 1 in which the trihalomelamine is present in an amount of about 2 to 25 parts by weight per 100 parts of copolymer.

6. A composition of matter comprising a rubbery, substantially amorphous copolymer of ethylene and an alpha monoolefin of 3 to 5 carbon atoms cured by a trihalomelamine and a metal compound selected from the group consisting of zinc carbonate, zinc oxide, zinc sulfide, zinc nitrate, zinc phosphate, zinc sulfate, zinc stearate, cadmium carbonate, cadmium oxide, cadmium sulfide, cadmium nitrate, cadmium phosphate, cadmium sulfate, and cadmium stearate.

7. The composition of claim 6 in which the trihalomelamine is trichloromelamine.

8. The composition of claim 7 in which the metal compound is zinc oxide.

9. The composition of claim 8 in which the copolymer is an ethylene-propylene copolymer.

10. The composition of claim 9 in which the ethylene component is present in an amount of about 15 to 85 mol. percent.

11. The composition of claim 6 in which the trihalomelamine is utilized in an amount of 2 to 25 parts by weight and the metal compound is utilized in an amount of 1 to 25 parts by weight per 100 parts of copolymer.

12. A process of curing a rubbery, substantially amorphous copolymer of ethylene and an alpha monoolefin of 3 to 5 carbon atoms which comprises treating the copolymer at a temperature in the range of about 250° to 350° F. with a trihalomelamine.

13. The process of claim 12 in which a metal compound selected from the group consisting of zinc carbonate, zinc oxide, zinc sulfide, zinc nitrate, zinc phosphate, zinc sulfate, zinc stearate, cadmium carbonate, cadmium oxide, cadmium sulfide, cadmium nitrate, cadmium phosphate, cadmium sulfate, and cadmium stearate is also utilized in the curing.

14. The process of claim 13 in which the trihalomelamine is trichloromelamine.

15. The process of claim 14 in which the metal compound is zinc oxide.

References Cited in the file of this patent
UNITED STATES PATENTS

| | | |
|---|---|---|
| 2,184,888 | Muskat et al. | Dec. 26, 1939 |
| 2,299,069 | Chenicek | Oct. 20, 1942 |
| 2,628,214 | Pinkney et al. | Feb. 10, 1953 |
| 2,874,140 | Kloepfer | Feb. 17, 1959 |